United States Patent
Heholt

(10) Patent No.: US 7,014,259 B2
(45) Date of Patent: Mar. 21, 2006

(54) MULTI-LAYER COMPOSITE VEHICLE HEADLINER SUBSTRATE WITH HIC PROVISIONS

(75) Inventor: Susan Heholt, Rochester Hills, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 10/834,510

(22) Filed: Apr. 29, 2004

(65) Prior Publication Data

US 2005/0242627 A1 Nov. 3, 2005

(51) Int. Cl.
B60R 13/02 (2006.01)

(52) U.S. Cl. .................................. 296/214
(58) Field of Classification Search ............. 296/214
See application file for complete search history.

(56) References Cited

U.S. PATENT DOCUMENTS

| | | | | |
|---|---|---|---|---|
| 5,049,439 | A * | 9/1991 | Robinson | 442/225 |
| 5,082,716 | A | 1/1992 | Satterfield et al. | |
| 6,652,021 | B1 * | 11/2003 | Dykman et al. | 296/214 |
| 2002/0145298 | A1 * | 10/2002 | Williams et al. | 296/39.1 |
| 2002/0195844 | A1 * | 12/2002 | Hipwell | 296/214 |
| 2003/0021956 | A1 * | 1/2003 | Preisler et al. | 428/158 |
| 2003/0044580 | A1 * | 3/2003 | Gorowicz et al. | 428/172 |
| 2004/0198123 | A1 * | 10/2004 | Gillingham et al. | 442/327 |
| 2005/0082881 | A1 * | 4/2005 | Bristow et al. | 296/214 |

OTHER PUBLICATIONS

ACOUSTICOR Headliner Substrate, web page, Jul. 3, 2003, http://www.jci.com/asg-intro/overhead/a_cor_cross.htm.
ACOUSTICOR 100 Headliner Substrate, web page, Jul. 3, 2003, http://www.jci.com/asg-intro/overhead/a_cor_cross.htm.
POLYBOND Headliner Substrate, web page, Jul. 3, 2003, http://www.jci.com/asg-intro/overhead/a_cor_cross.htm.
THERMOBOND Headliner Substrate, web page, Jul. 3, 2003, http://www.jci.com/asg-intro/overhead/a_cor_cross.htm.

* cited by examiner

Primary Examiner—Dennis H. Pedder
(74) Attorney, Agent, or Firm—Ralph E. Smith

(57) ABSTRACT

A combination of layered materials for producing a vehicle headliner is provided. The layers include a head impact countermeasure (HIC) layer of co-extruded thermoplastic and a rigid foam layer laid adjacent to the HIC layer and made of a thermoplastic. The layers are subsequently molded together to form the headliner.

10 Claims, 1 Drawing Sheet

US 7,014,259 B2

MULTI-LAYER COMPOSITE VEHICLE HEADLINER SUBSTRATE WITH HIC PROVISIONS

FIELD OF THE INVENTION

This invention relates generally to vehicle headliners and particularly to vehicle headliners of laminated construction.

BACKGROUND OF THE PRIOR ART

The interior roof of motor vehicles is commonly outfitted with a vehicle headliner. The vehicle headliner provides several benefits. For example, the headliner provides thermal insulation to help keep the vehicle interior at a comfortable temperature. The headliner also provides acoustical dampening to reduce the level of noise inside the passenger compartment for the vehicle. The headliner also provides a decorative finish to the interior of the vehicle roof.

Additional structures are often positioned between the vehicle headliner and the roof of the vehicle. These additional structures provide a head impact countermeasure (HIC) to reduce the risk of head injury in the event of an accident. The HIC is generally formed of a plastic and positioned between the headliner and the vehicle roof and operates by deforming under the impact force of a vehicle occupant's head. During deformation, the HIC dissipates crash energy and thereby provides a degree of protection to the vehicle occupant.

The HIC structures are commonly positioned between the headliner and the vehicle roof by one or more methods known in the art. These methods include adhering the HIC structure to the headliner and fastening it to the vehicle roof and peripheral structure. Regardless of the method used to position the HIC structure, an undesirable assembly step is introduced to the manufacture of the vehicle or its headliner. Also, undesirable tooling expenses are incurred in creating the requisite molds or other devices used to form and assemble the HIC structures separately from the headliner.

It is also desirable to improve the recyclability of vehicle headliners. Presently, vehicle headliners are formed from several layers of materials. One of these materials is glass mat or fiberglass. Other adhesives and cross-linked resins such as polyol and isocyanate are also used to secure the layers to each other. These materials, adhesives and resins make recycling vehicle headliners less than desirable since they are difficult, if not impossible, to remove from the headliner prior to recycling. However, when left in, these materials reduce the usefulness of the resultant recycled material.

BRIEF SUMMARY OF THE INVENTION

In light of these issues identified with the prior art, a vehicle headliner is provided having a combination of layered materials. The layers include a head impact countermeasure (HIC) layer of co-extruded thermoplastic and a rigid foam layer laid adjacent to the HIC layer and made of a thermoplastic. The layers are subsequently molded together to form the headliner.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE INVENTION

Figure 1:
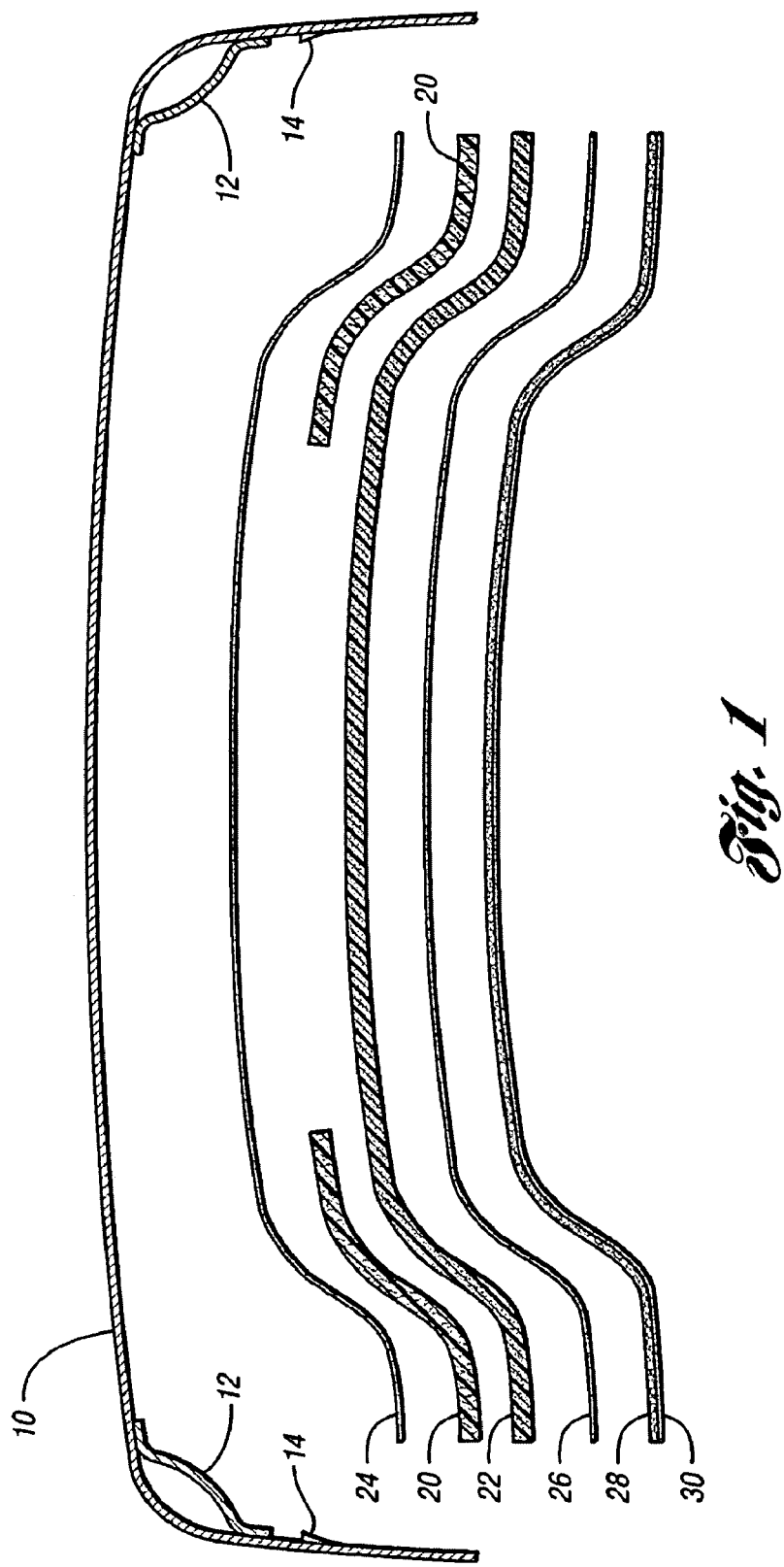
FIG. 1 depicts a cross-section exploded view of a vehicle roof and headliner.

Turning to FIG. 1, a vehicle roof 10 is shown in a cross section taken normal to the axial length of the vehicle. Vehicle roof 10 is of a generally planar shape and formed of metal or composite material, such as fiber reinforced plastic. The roof 10 has exterior surface which is open or exposed to the elements and an interior which is coverable the vehicle headliner assembly as described herein. Beams 12 are provided at the outer edges of the vehicle roof 10 provide rigidity to the roof 10. A protrusion 14 is provided on a vertical pillar supporting the roof 10. The protrusion 14 may be used to retain the vehicle headliner as described later herein.

A HIC layer 20 is provided by a co-extruded polypropylene composite formed into woven fabrics or sheets, such as those which are commercially available under the trademark PURE from LANKHORST-INDUTECH. The HIC layer 20 preferably spans less than the width of the roof 10 and is preferably located so as to result in a spaced relationship from beam 12 after the headliner is molded as described later herein. The spaced relationship provides a crush space between the HIC layer 20 and beams 12 after the headliner is molded and positioned in the vehicle. A rigid foam layer 22 of a material such as polyester or polypropylene 22 is layered beneath the HIC layer 20. A light blocking layer 24 may be provided above the head HIC layer 20 to preventing the transmission of visible light through the various layers of the headliner assembly. The light blocking layer 24 may also operate as an acoustical damper to reduce the level of noise in the vehicle. Additionally, an acoustical scrim layer 26 may be provided below the rigid foam layer 22. The acoustical scrim layer operates to also reduce or operates to reduce the level of noise in the passenger compartment of the vehicle. A decorative finish may be provided by foam layer 28 and fabric 30 as an outer layer which is exposed to the vehicle interior. The layers 24, 26, 28 and fabric 30 are preferably formed of a polyester or polypropylene thermoplastic. To simplify the molding process described later herein, it is preferable that layers 22, 24, 26 and 28 have a melting temperature approximately equal to the melting layer of the surface of the co-extruded polypropylene used in the HIC layer.

To produce a vehicle headliner, the layers of the vehicle headliner are placed one upon another inside of a heated mold. The mold has two halves which form an internal cavity conforming to the desired finished shape of the vehicle headliner. Once the desired layers have been placed in the mold, the mold is closed for a predetermined amount of time allowing the desired layers to fuse together into a unitary vehicle headliner assembly.

Once the completed headliner assembly is removed from the mold it may be trimmed of excess material and openings formed therein using methods known in the art. The unitary headliner assembly may then be installed in the vehicle by placing it against the roof 10 and snapping the periphery of the headliner assembly above the protrusions 14. The headliner assembly may also be retained by a peripheral trim molding as in known in the art.

Since the unitary headliner assembly includes a HIC layer 20, additional vehicle or headliner assembly steps are avoided, as are tooling costs associated with a separate HIC structure.

A unitary headliner assembly formed from the layers described herein may be recycled by removing the headliner assembly from the vehicle and shredding the entire assembly. The resultant shredded material is composed of polypropylene or polyester thermoplastic, depending on the materials chosen for forming the headliner, and free of glass fibers, adhesives, and resins.

While the best mode for carrying out the invention has been described in detail, those familiar with the art to which this invention relates will recognize alternative designs and embodiment for practicing the invention. Thus, the above described preferred embodiment is intended to be illustrative of the invention that may be modified within the scope of the following appended claims.

What is claimed is:

1. A vehicle headliner having a combination of layered materials comprising:
    a head impact countermeasure layer of co-extruded thermoplastic; and
    a rigid foam layer laid adjacent to said head impact countermeasure layer and made of a thermoplastic, wherein said thermoplastic head impact countermeasure layers are and said rigid foam subsequently molded together to form the headliner free of glass fibers, adhesives and resins.

2. The vehicle headliner of claim 1 wherein said co-extruded thermoplastic comprises a polypropylene composite.

3. The vehicle headliner of claim 1 further comprising an acoustical scrim layer made of one of polyester and polypropylene.

4. The vehicle headliner of claim 1 further comprising a foam layer adjacent to a fabric layer with said fabric layer being positioned as an outer layer, wherein said foam layer and said fabric layers are made of one of polyester and polypropylene.

5. The vehicle headliner of claim 1 further comprising a light blocking layer made of one of polyester and polypropylene.

6. A vehicle headliner for positioning proximate the interior of a vehicle roof having substantially parallel beams at its outer edges, said headliner comprising:
    a head impact countermeasure layer of co-extruded thermoplastic, said head impact countermeasure layer being formed to provide a crush space between at least one of the beams and the head impact countermeasure layer and;
    a rigid foam layer fused to said head impact countermeasure layer to form the headliner free of glass fibers, adhesives and resins.

7. The vehicle headliner of claim 6 wherein said co-extruded thermoplastic comprises a polypropylene composite.

8. The vehicle headliner of claim 6 further comprising an acoustical scrim layer made of one of polyester and polypropylene.

9. The vehicle headliner of claim 6 further comprising a foam layer adjacent to a fabric layer with said fabric layer being positioned as an outer layer, wherein said foam layer and said fabric layers are made of one of polyester and polypropylene.

10. The vehicle headliner of claim 6 further comprising a light blocking layer made of one of polyester and polypropylene.

* * * * *

UNITED STATES PATENT AND TRADEMARK OFFICE
CERTIFICATE OF CORRECTION

| | | |
|---|---|---|
| PATENT NO. | : 7,014,259 B2 | Page 1 of 1 |
| APPLICATION NO. | : 10/834510 | |
| DATED | : March 21, 2006 | |
| INVENTOR(S) | : Heholt | |

It is certified that error appears in the above-identified patent and that said Letters Patent is hereby corrected as shown below:

<u>Column 3, Line 27 - Claim 1:</u>

Delete "layers are" and replace with --layer--

Insert "are" after --foam--

Signed and Sealed this

Twenty-second Day of August, 2006

JON W. DUDAS
*Director of the United States Patent and Trademark Office*